Aug. 23, 1949.    R. R. RANDALL    2,479,638
NONEQUALIZING TORQUE DIFFERENTIAL TRANSMISSION
Filed Jan. 23, 1946
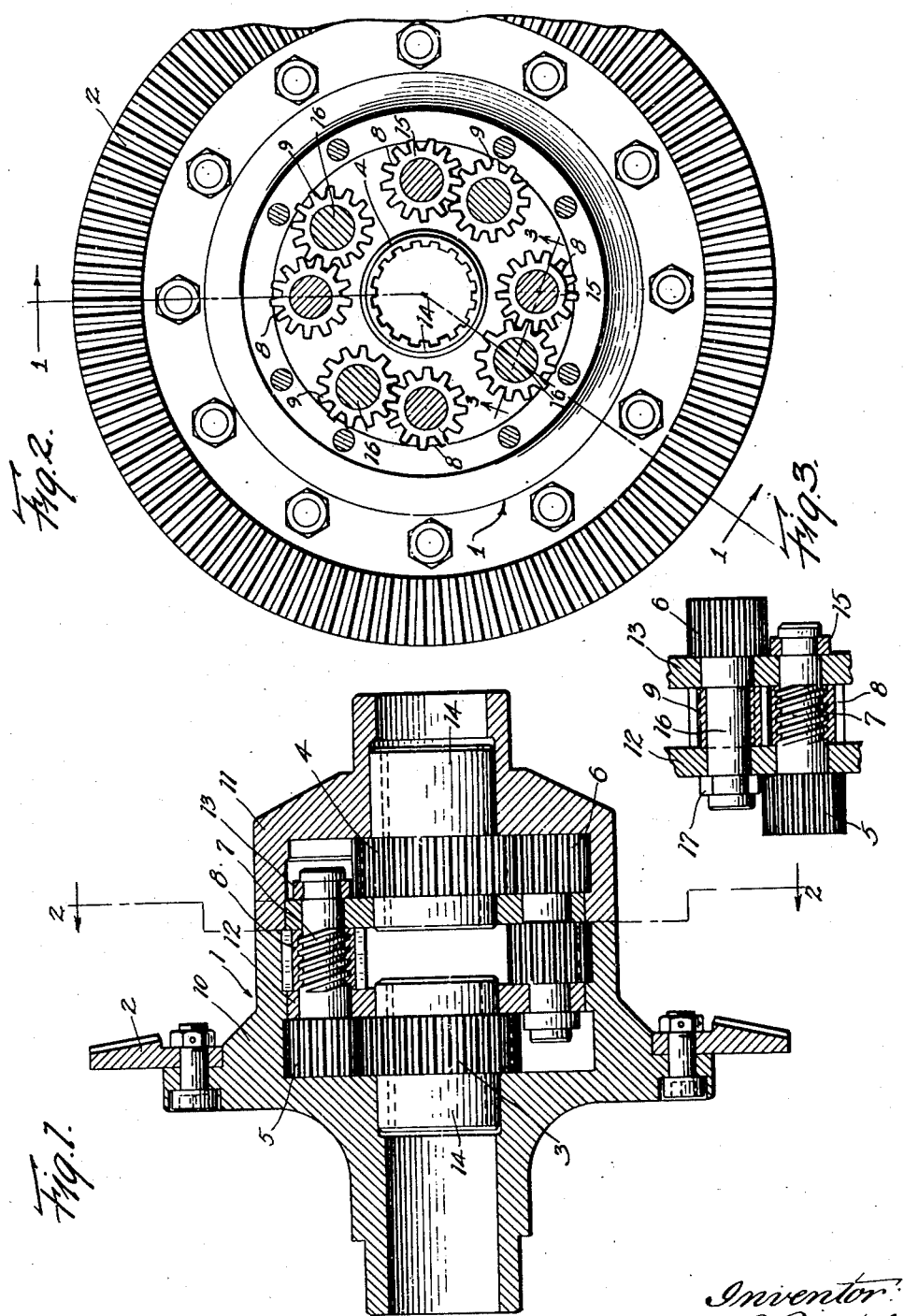

Patented Aug. 23, 1949

2,479,638

UNITED STATES PATENT OFFICE 2,479,638

NONEQUALIZING TORQUE DIFFERENTIAL TRANSMISSION

Ralph R. Randall, Freeport, Ill., assignor, by mesne assignments, to Dualoc Engineering Co., Rockford, Ill., a corporation of Illinois Application January 23, 1946, Serial No. 642,810

8 Claims. (Cl. 74—315)

My invention relates to non-equalizing torque differential transmissions.

One of the objects of my invention is to provide a non-equalizing torque differential transmission which will be compact and rugged in construction, efficient in operation, durable in use and relatively inexpensive to manufacture.

A further object is to provide such a construction using simple spur gear transmission elements and simple screw threaded constructions for the locking action.

Further objects and advantages of the invention will be apparent from the description and claims.

In the drawings, in which an embodiment of my invention is shown,

Figure 1 is an axial section of a differential transmission taken on the line 1—1 of Fig. 2;

Fig. 2 is a section substantially on the line 2—2 of Fig. 1; and

Fig. 3 is a section substantially on the line 3—3 of Fig. 2.

Referring to the drawings in detail, the construction shown comprises a rotatable gear carrier 1 which may be driven through the bevel gear 2 from the propeller shaft of a motor vehicle, two spur gears 3 and 4 coaxial with the rotatable gear carrier 1 and rotatably mounted with respect thereto, to which the axles of the ground-engaging wheels may be splined, respectively, and transmission between said gear carrier 1 and spur gears 3 and 4 comprising a plurality of pairs of spur gears, one gear 5 of each pair meshing with the axle gear 3 and the other gear 6 of each of said pairs meshing with the other axle gear 4, a plurality of externally-threaded shafts 7 rotatable, respectively, with one of the spur gears 5, a plurality of internally threaded spur gears 8, one threaded on each shaft 7, a plurality of spur gears 9 meshing, respectively, with said internally threaded spur gears 8 and rotatable, respectively with the gears 6, and means for limiting the threading movement of said threaded gears 8 on said threaded shafts 7 to lock the threaded gears and threaded shafts to the gear carrier 1.

The gear carrier 1 comprises two cup-like housing members 10 and 11 rigidly secured together to rotate as a unit and two spider bearing plates or members 12 and 13 secured to rotate as a unit with the casing members. The hubs 14 of the axle gears may be rotatably mounted in bearing openings in the cup-like housing members 10 and 11 and bearing members 12 and 13.

The screw threaded shaft 7 with which the spur gear 5 is rotatable is held against axial movement in the bearing plates 12 and 13 by means of a shouldered collar 15 secured on the threaded shaft 7 which is engageable with the bearing disc 13 and an annular side shoulder on the spur gear 5 which is engageable with the other bearing disc 12. One side face of the internally threaded gear 8 may engage the inner face of the bearing disc 13 and the other side face of this gear may be brought into engagement with the inner face of the other bearing disc 12. Either of these engagements will cause the spur gear 5 to be clamped against relative rotation with respect to the gear carrier 1. The shaft 16 which may be integral with the spur gear 6 and to which the spur gear 9 may be splined is held against axial movement in one direction by the engagement of the side face of the spur gear 6 with the outside face of the bearing plate 13 and against axial movement in the other direction by the engagement of the collar 17 with the outside face of the other bearing plate 12.

In use, if one ground engaging wheel has traction and the other does not and power is being applied to turn the gear carrier 1, the threaded gears 8 will rotate slightly, due to the road resistance of the ground wheel which has traction until each of these internally threaded gears 8 has rotated sufficiently to cause it to clamp one or the other of the bearing spiders 12 or 13 between either the shouldered collar 15 or the shouldered gear 5 to lock the internally threaded gear 8, the gears 9 and 6, the threaded shaft 7 and the gear 5 against further rotation with respect to the gear carrier. Further driving force of the gear carrier will be transmitted directy to the axle gear and axle of that wheel which has traction through one or the other of the locked spur gears 5 or 6, regardless of the fact that one of the ground-engaging wheels has no tractive effect.

When both ground wheels have tractive effect and the vehicle is travelling a straight course, power will be transmitted equally to both ground wheels. If the vehicle is going around a corner and one or the other of the ground-engaging wheels has to precess, the driving effort will be transmitted to the locked lagging wheel, the other wheel precessing as required because of its engagement with the ground.

While I have described the gears as spur gears and have shown them in the drawings as non-helical gears, it is obvious that they might be made helical gears in order to lessen noise and vibration, so long as the drive between two meshing gears is reversible, and in the claims where the expression "spur gears" is used, it is to be understood as covering such helical gears.

While I have shown and described the transmission as applied to the drive wheels of an automotive vehicle, it is obvious that it might be used for differentiating between the two wheels of a dual wheel construction and that the controlled wheels might be either drive wheels or steering wheels.

I have found in practice that a 15 degree pitch angle or slope of the threads of the shaft 7 gives satisfactory results for certain types of transmission although this may vary depending on conditions, materials used, etc.

I claim:

1. A non-equalizing-torque differential comprising a rotatable gear carrier, two rotatable elements coaxial with said gear carrier and a transmission between said gear carrier and rotatable elements comprising a pair of spur gear elements rotatable with said rotatable elements, respectively, a second pair of spur gear elements meshing with said first pair of gear elements, respectively, an externally screw-threaded shaft rotatable with one of said second pair of spur gear elements, an internally threaded spur gear element having a threading movement on said shaft, a spur gear element meshing with said internally-threaded spur gear element and rotatable with the other one of said second pair of spur gear elements, and means for limiting the threading movement of said internally threaded gear element on said threaded shaft acting to bind said threaded gear element and threaded shaft to said gear carrier.

2. A non-equalizing-torque differential comprising a rotatable gear carrier, two rotatable elements coaxial with said gear carrier and a transmission between said gear carrier and rotatable elements comprising a first pair of external spur gear elements rotatable with said rotatable elements, respectively, a second pair of spur gear elements meshing with said first pair of gear elements, respectively, an externally screw-threaded shaft rotatable with one of said second pair of spur gear elements, an internally threaded spur gear element having a threading movement on said shaft, a spur gear element meshing with said internally-threaded spur gear element and rotatable with the other one of said second pair of spur gear elements, and means for limiting the threading movement of said internally threaded gear element on said threaded shaft acting to bind said threaded gear element and threaded shaft to said gear carrier.

3. A non-equalizing-torque differential comprising a rotatable gear carrier, two rotatable elements coaxial with said gear carrier and a transmission between said gear carrier and rotatable elements comprising a first pair of spur gear elements rotatable with said rotatable elements, respectively, a plurality of second pairs of spur gear elements, one gear element of each second pair meshing with one gear element of said first pair and the other gear element of each second pair meshing with the other gear element of said first pair, a plurality of externally screw-threaded shafts, rotatable, respectively, with one of each pair of said plurality of pairs of spur gear elements, a plurality of internally-threaded spur gear elements, one having a threading movement on each shaft, a plurality of spur gear elements meshing with said internally-threaded spur gear elements, respectively, and rotatable, respectively, with the other one of each pair of said plurality of pairs of spur gear elements, and means for limiting the threading movement of said internally threaded gear elements on said threaded shafts acting to bind said threaded gear elements and threaded shafts to said gear carrier.

4. A non-equalizing-torque differential comprising a rotatable gear carrier, two rotatable elements coaxial with said gear carrier and a transmission between said gear carrier and rotatable elements comprising a pair of spur gear elements rotatable with said rotatable elements, respectively, a second pair of spur gear elements meshing with said first pair of gear elements, respectively, an externally screw-threaded shaft rotatable with one of said second pair of spur gear elements, an internally threaded spur gear element having a threading movement on said shaft, a spur gear element meshing with said internally-threaded spur gear element and rotatable with the other one of said second pair of spur gear elements, and means for limiting the threading movement of said internally-threaded gear element on said threaded shaft acting to bind said threaded gear element and threaded shaft to said gear carrier comprising an abutment engaged by said gear element in its threading movement.

5. A non-equalizing-torque differential comprising a rotatable gear carrier, two rotatable elements coaxial with said gear carrier and a transmission between said gear carrier and rotatable elements comprising a pair of spur gear elements rotatable with said rotatable elements, respectively, a second pair of spur gear elements meshing with said first pair of gear elements, respectively, an externally screw-threaded shaft rotatable with one of said second pair of spur gear elements, an internally threaded spur gear element having a threading movement on said shaft, a spur gear element meshing with said internally-threaded spur gear element and rotatable with the other one of said second pair of spur gear elements, and means for limiting the threading movement of said internally threaded gear element on said threaded shaft acting to bind said threaded gear element and threaded shaft to said gear carrier comprising a pair of abutments on opposite sides of said gear element engaged by said gear element in its threading movement.

6. A non-equalizing-torque differential comprising a rotatable gear carrier, two rotatable elements coaxial with said gear carrier and a transmission between said gear carrier and rotatable elements comprising a pair of gear elements rotatable with said rotatable elements, respectively, a second pair of gear elements in force-transmitting relation to said first pair of gear elements, respectively, an externally screw-threaded shaft rotatable with one of said second pair of gear elements, an internally threaded gear element having threading movement on said shaft, a gear element meshing with said internally-threaded gear element and rotatable with the other one of said second pair of gear elements, and means for limiting the threading movement of said internally threaded gear element on said threaded shaft acting to bind said threaded gear element and threaded shaft to said gear carrier.

7. A non-equalizing-torque differential comprising a rotatable gear carrier, two rotatable elements coaxial with said gear carrier and a transmission between said gear carrier and rotatable elements comprising a pair of gear elements rotatable with said rotatable elements, respectively, a second pair of gear elements in force-transmitting relation to said first pair of gear elements, respectively, an externally screw-threaded shaft rotatable with one of said second pair of gear elements, an internally-threaded spur gear element having threading movement on said shaft, a spur gear element meshing with said internally-threaded gear element and rotatable with the other one of said second pair of gear elements, and means for limiting the threading movement of said internally threaded gear element on said threaded shaft acting to bind said threaded gear element and threaded shaft to said gear carrier.

8. A gear transmission device comprising a gear bearing element, two intermeshing spur gear elements rotatably mounted on said gear bearing element, two spur gear elements each coaxial, respectively, with one of said first two gear elements, an externally threaded shaft coaxial and rotatable with one of said gear elements, the gear element coaxial therewith being internally threaded and having threading movement on said shaft, and means for limiting the threading movement of said internally threaded gear element on said shaft to bind said threaded gear element and threaded shaft to said gear bearing element.

RALPH R. RANDALL.

REFERENCES CITED

The following references are of record in the file of this patent:

UNITED STATES PATENTS

| Number | Name | Date |
| --- | --- | --- |
| 1,355,152 | Laird | Oct. 12, 1920 |
| 1,361,895 | Nogrady | Dec. 14, 1920 |
| 1,397,066 | Williams | Nov. 15, 1921 |
| 1,413,982 | Gill | Apr. 25, 1922 |
| 1,431,535 | MacDonald | Oct. 10, 1922 |
| 1,938,457 | McCoffery | Dec. 5, 1933 |
| 1,938,649 | Welsh | Dec. 12, 1933 |

FOREIGN PATENTS

| Number | Country | Date |
| --- | --- | --- |
| 308,451 | Great Britain | Mar. 28, 1929 |